United States Patent [19]

Rippingale et al.

[11] Patent Number: 4,909,341

[45] Date of Patent: Mar. 20, 1990

[54] UNMANNED ARTICULATED VEHICLE

[75] Inventors: Roy M. Rippingale; Peter J. Gibson, both of Surrey, England

[73] Assignee: The Secretary of State for Defence in Her Britannic Majesty's Government of the United Kingdom of Great Britain and Northern Ireland, London, United Kingdom

[21] Appl. No.: 91,068

[22] PCT Filed: Oct. 27, 1986

[86] PCT No.: PCT/GB86/00663

§ 371 Date: Aug. 7, 1987

§ 102(e) Date: Aug. 7, 1987

[87] PCT Pub. No.: WO87/02635

PCT Pub. Date: May 7, 1987

[30] Foreign Application Priority Data

Oct. 29, 1986 [GB] United Kingdom ............. 8526602

[51] Int. Cl.[4] .................. B62D 55/065; B62D 55/07; B62D 11/20
[52] U.S. Cl. ................................ 180/9.1; 180/9.4; 180/9.46; 180/14.2; 280/400; 280/493; 280/494; 280/416.1
[58] Field of Search .............. 180/9.1, 9.23, 9.32, 180/9.4, 9.42, 9.44, 9.46, 14.2, 139, 14.4; 280/492, 493, 494, 415 A, 400

[56] References Cited

U.S. PATENT DOCUMENTS

| | | | |
|---|---|---|---|
| 484,829 | 10/1892 | Stewart | 180/9.46 |
| 1,494,687 | 5/1924 | Hine | 280/415 A |
| 1,553,777 | 9/1925 | Holldack | 280/492 |
| 2,310,775 | 2/1943 | Gavagnin | 180/9.46 |
| 3,245,488 | 4/1966 | Peterson | 180/14.2 |
| 3,650,343 | 3/1972 | Helsell | 180/9.4 |

FOREIGN PATENT DOCUMENTS

| | | | |
|---|---|---|---|
| 619549 | 10/1935 | Fed. Rep. of Germany | 180/9.1 |
| 3312222 | 10/1984 | Fed. Rep. of Germany | |
| 87/02635 | 5/1987 | PCT Int'l Appl. | 280/400 |

Primary Examiner—Charles A. Marmor
Assistant Examiner—Mitchell J. Hill
Attorney, Agent, or Firm—William R. Hinds

[57] ABSTRACT

A tracked vehicle of narrow aspect suitable for unmanned operation both in hazardous environments and on routes normally accessible only to pedestrians, comprises two identical vehicle units (1, 2) each having an independently drivable, full width track (3), the units being interconnected in tandem configuration by an articulation mechanism (9) permitting relative rotation about a yaw axis (Y). In one aspect the articulation mechanism is passive, being arranged with an offset yaw axis, thereby permitting steering by application of a velocity differential to the two tracks. In a second aspect the articulation mechanism is active being powered by an actuator (94) to provide articulation steering. The articulated units may also be secured in parallel configuration for conventional skid-steering operation.

7 Claims, 3 Drawing Sheets

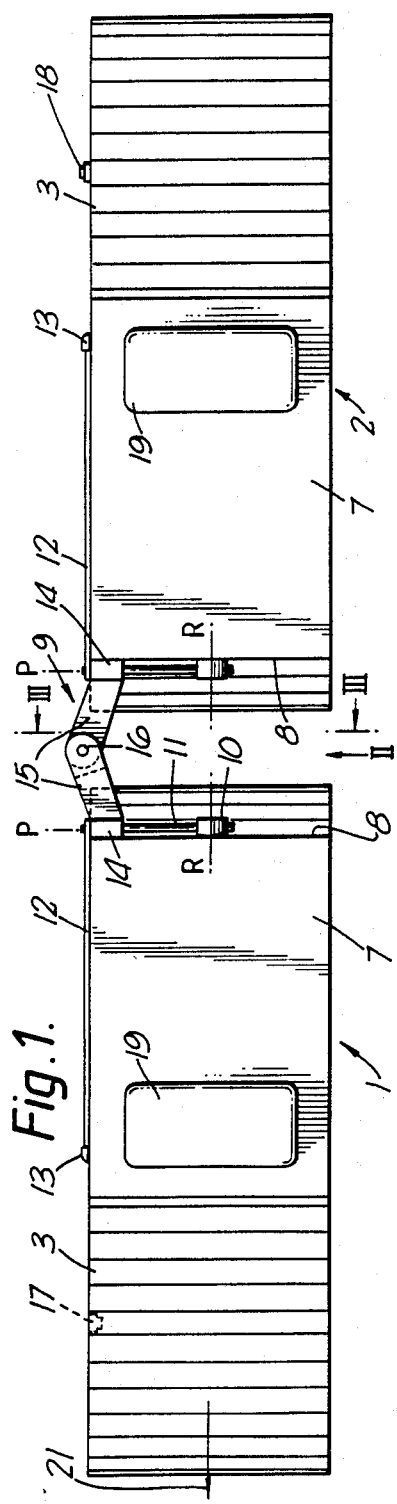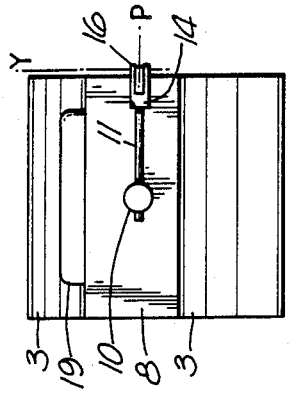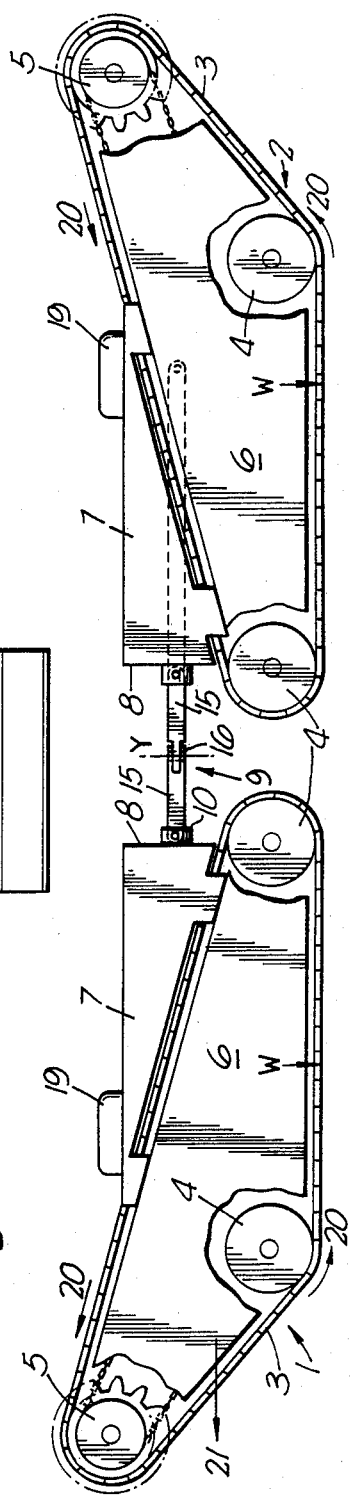

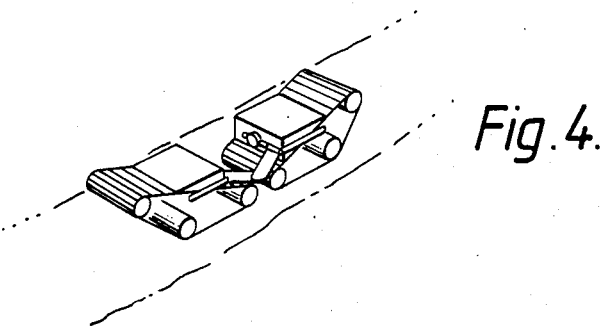
Fig. 4.
Fig. 5.
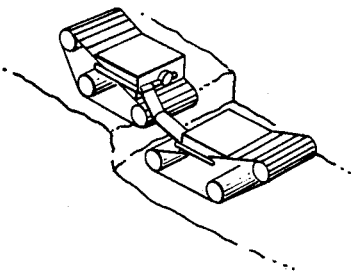
Fig. 6.
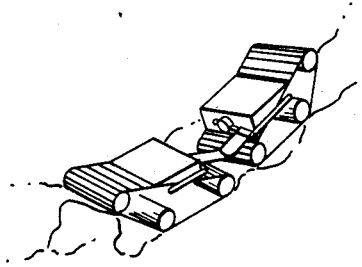
Fig. 7.
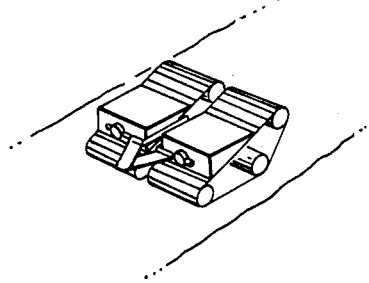

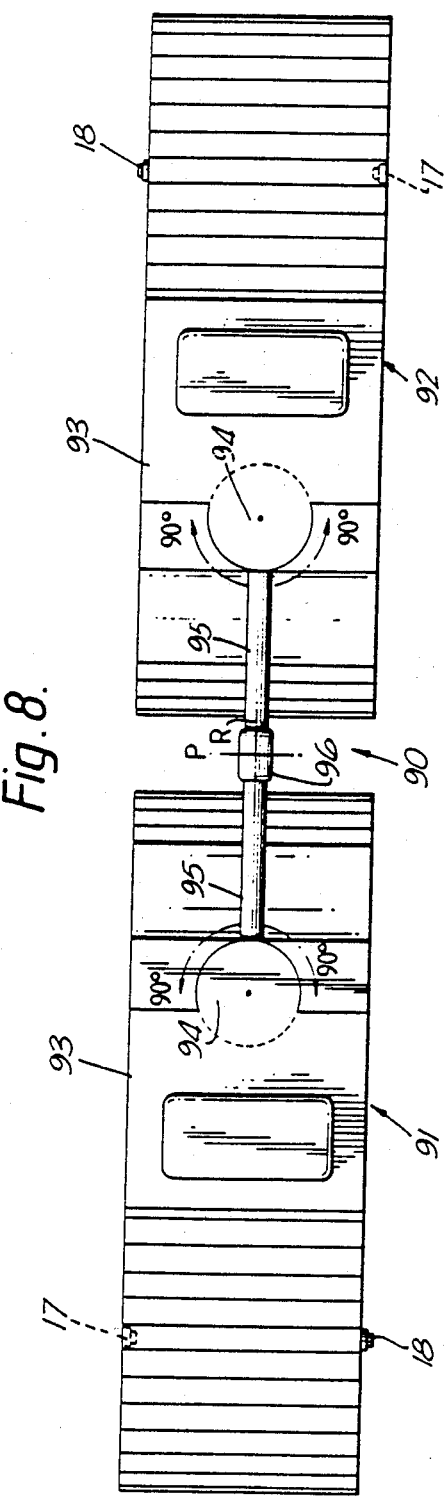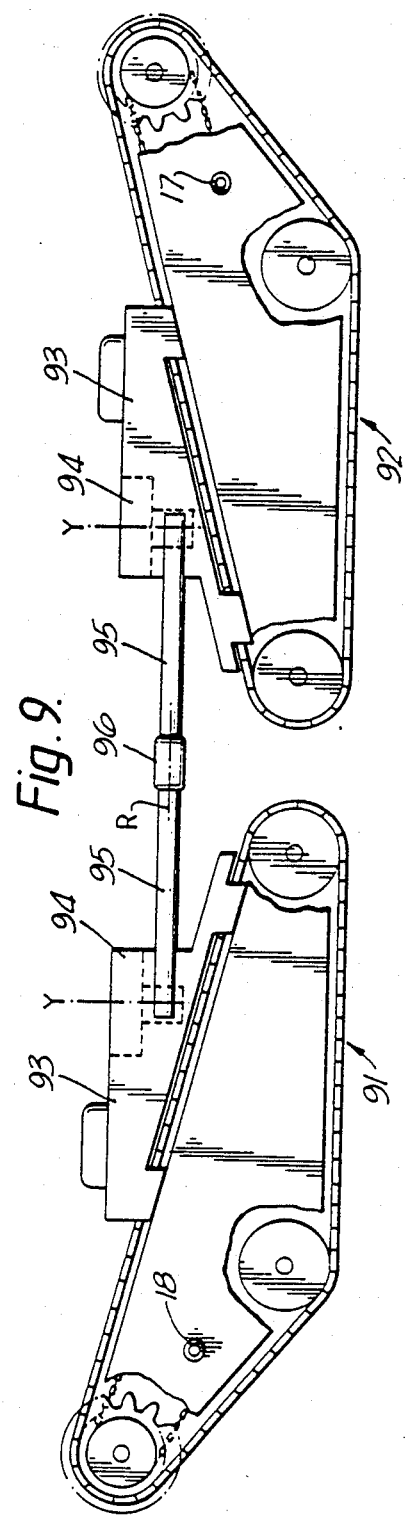

UNMANNED ARTICULATED VEHICLE

TECHNICAL FIELD OF THE INVENTION

This invention relates to a tracked vehicle suitable for unmanned deployment in hazardous environments and capable of using routes normally only accessible to pedestrians.

BACKGROUND ART

The mobility of an unmanned vehicle is extremely dependent upon the terrain, obstacles in the path of the vehicle causing various mobility failures such as overturning, gross slippage, nose-in failure and hang-up failure, the latter two being caused by engagement of the nose and belly respectively of the vehicle with the terrain.

Susceptibility to such failures can be reduced to some extent by the use of large vehicle size as obstacles then become less significant but, for certain mobility objectives, eg a vehicle that could go anywhere a man could walk, excessive dimensions are not practicable. Walking machines have been often proposed for high mobility, and it is certainly true that many animals with legs are highly mobile and if one is attempting to duplicate their capabilities it is reasonable to consider using similar mechanisms. However, the potential for mobility failure is much higher than that of more conventional vehicles, as each foot must be safely placed and moved in such a way as to produce the desired vehicle motion. Simple control strategies can be used but these do not in general produce the mobility apparent in legged animals. For these reasons fully fledged walking machines are not practical at present although some mobility aids are known which go some way in this direction.

Wheeled or tracked vehicles are more appropriate for unmanned use, but the width necessary for stable operation of most conventional vehicles prevents them from following many routes that are easy for a man. A motorcycle has very good mobility from many respects but is vulnerable to a great many failure modes and is only useful when allied with a competent operator. Very small tracked vehicles are also known which are designed to be able to operate inside buildings and to climb stairways, but these are unable to carry a large payload and are defeated by fairly simple obstacles.

Wide track vehicles of larger size are known for coping more effectively with obstacles, the substantially full underside cover provided by the twin wide tracks used making the vehicle bellyless and hence less susceptible to hang-up failure. However these vehicles need substantial width for effective steering, the mode of steering normally employed being skid steering, in which the two independently drivable, parallel tracks are made to skid about a pivot axis trajectory determined by the velocity differential of the two parallel tracks and by the load distribution of the vehicle upon them.

The present invention seeks to provide a bellyless vehicle of narrower aspect capable of an alternative steering mode.

THE INVENTION

Accordingly, the present invention comprises an articulated vehicle comprising two separate vehicle units each provided with a single, full width, independently drivable track, and having center lines, the two units being interconnected in tandem arrangement by an articulation mechanism having a single jaw pivot only, enabling relative rotation of the two vehicle units about a yaw axis which is offset from the center lines of the two vehicle units, the vehicle being steerable by application of a velocity differential between the two tracks, which controls the said rotation.

Conveniently, the articulation mechanism is capable of being rotated through 180° so as to permit the two units to be folded together and locked in parallel track configuration for conventional skid-steer if and when a wider base and/or a tighter turning circle is required. Self engaging latches are conveniently disposed interjacent the two confrontable sides of the vehicle units for maintaining this parallel track configuration in use.

Preferably the articulation mechanism further provides rotation about a roll axis and a pitch axis, the angular deflection of either of which may be unrestricted or limited or, in some modes of operation subjected to programmed control.

Each vehicle unit preferably has a chassis and a covering body disposed entirely within the perimeter of the track, drive mechanisms for the track being mounted therein. The body is further provided with a top hamper bridging the tracks, to which the articulation mechanism is attached. Access to the drive mechanisms may be achieved by a drawer system, ie the various components being slideably mounted on runners transverse to the longitudinal centre line of the unit.

The maximum height of obstacle that can be mounted by each vehicle unit is of course dependent upon the length of the ground-engageable portion of its track, ie track base. In a preferred arrangement, the track rotates upon three direction changing rollers only, two lower rollers of the three defining the track base and the third, upper roller being disposed forwardly of the track base. This configuration is preferable to the four direction changing rollers of conventional tracks in providing a longer track base and shifting the centre of gravity of the unit forward; thereby to provide a unit which will also behave well in a backwards direction. Vehicle units of this configuration may be conveniently interconnected in back-to-back arrangement.

SPECIFIC EXAMPLE OF THE INVENTION

Specific embodiments in accordance with the invention will now be described by way of example only with reference to the accompanying drawings of which FIG. 1 is a diagrammatic plan view of two vehicle units provided with a passive articulation mechanism, FIG. 2 is a side elevation of the same two units from viewpoint II of FIG. 1, FIG. 3 is an end view of one of the same vehicle units viewed from line III—III of FIG. 1, FIGS. 4, 5 and 6 are perspective diagrams of the same two units in tandem operation on level ground and with pitch and roll displacements respectively, FIG. 7 is a perspective diagram of the same two units in parallel track configuration, and The articulated vehicle illustrated in FIGS. 1, 2 and 3 comprises two identical vehicle units 1 and 2, each having a full width track 3 independently drivable in forward and reverse direction around two full width lower rollers 4 and a full width upper roller 5 comprising a track drive sprocket roller disposed forwardly of the track base defined by the lower rollers 4 and located so as to ensure that the centre of gravity of the unit acts substantially midway between the two rollers 4. The rollers 4 and 5 are supported by a chassis (not seen) enclosed by a body 6 located within the periphery of the track 3. Drive mechanisms (not shown) are mounted within the body 6, which body also supports a top hamper 7 having an end face 8.

The two units 1 and 2 are interconnected by a passive articulation mechanism 9 which includes for each unit a roll pivot 10 attached centrally to the end face 8 so as to be rotatable about a roll axis R, the pivot 10 having a radial arm 11 disposed to extend laterally to the edge of the face 8 when in non-roll condition (see FIG. 3). The distal end of the arm 11 is flexibly attached to a tie bar 12 which extends along the side of the unit to engage the body 6 at a ball joint 13.

Also at the distal end of the radial arm 11, adjacent the tie bar 12, is a pitch pivot 14 to which is attached one end of a linkage arm 15 so as to be deflectable about a pitch axis P in line with the radial arm 11. The other ends of the linkage arm 15 of each unit are mutually conjoined at a yaw pivot 16 so as to be relatively rotatable about a yaw axis Y.

Self-engaging latches 17 and 18 are attached to one side of each body 6 of the two units 1 and 2 respectively so as to be engageable when the units are folded together about the yaw axis Y.

Electronic drive control means 19 including sensors, analysers and motivators (not shown) are located on each top hamper 7, which control means may be arranged for remote command or for command by a preprogrammed computer also included in the drive control means 19 so as to make the vehicle autonomous.

In operation, when the tracks 3 of both units 1 and 2 are driven at the same speed but in opposed directions relative to the respective body 6 (as indicated by arrows 20 in FIG. 2), the two units will proceed in tandem along a straight course in the direction indicated by arrow 21 of FIGS. 1 and 2. This mode of travel is also illustrated diagrammatically in FIG. 4.

Application of a positive velocity differential to the lead unit (unit 1 as drawn) either by increasing the track speed of the lead unit or by decreasing the track speed of the rear unit, will cause the lead unit to slew in a clockwise direction, as viewed in FIG. 1, about the yaw axis Y, thereby steering the vehicle to the right. Conversely, a negative velocity differential will cause the lead unit to slew counter clockwise thereby steering the vehicle to the left. Upon removal of the velocity, the two units will continue along a circular course, the radius of which is dependent upon the duration and magnitude of the previously applied differential. A subsequent application of a similar velocity diffential in reversed direction will cause the rear unit to slew back into line with the lead unit, whereafter continuance of a zero differential will allow the units to proceed in tandem along a straight course departing tangentially from the circular course.

The pitch pivots 14 of the articulation mechanism 9 permit the in-tandem units to pitch relatively when riding over uneven, stepped terrain as is depicted in FIG. 5 and the roll pivots 10 permit relative roll when either one of the units is tilted laterally by obstacles or varying cross slopes, as is illustrated in FIG. 6.

An additional mode of operation is available as illustrated in FIG. 7, for which the two units 1 and 2 are folded together from the tandem configuration into a parallel track configuration by continued application of a positive velocity differential to the lead unit 1, thus causing the unit 1 to slew clockwise through 180° until the latches 17 and 18 engage. Once the vehicle is in this configuration, any velocity differentials applied to the two, now parallel, tracks 3 will drive the vehicle in conventional skid steering mode, thus providing a facility for tighter turning circles and greater lateral stability, the latter facility being particularly useful when steep, open cross slopes are encountered.

Clearly the turning circle of the tandem configuration is limited when the vehicle is turning away from the side at which the yaw axis is located (turning to the left as seen in FIG. 1), by the restricted separation between the two units 1 and 2, which separation is desirably as small as possible within the constraints of permitting full closure on the yaw axis side, to minimise the possibility of mobility failure due to obstruction by large obstacles intruding between the two tracks 3.

The articulated vehicle may be advantageously used for various purposes, for example, for sentry, surveillance, supply or decoy duties. It can be used in hazardous environments where a man's health or life would be at risk and may also be adapted for underwater use.

We claim:

1. An articulated vehicle comprising two separate vehicle units each provided with a single, full width, independently drivable track, and having centre lines, the two units being interconnected in tandem arrangement by an articulation mechanism having a single yaw pivot only, enabling relative rotation of the two vehicle units about a yaw axis which is offset from the centre lines of the two vehicle units, the vehicle being steerable by application of a velocity differential between the two tracks, which controls the said rotation.

2. A vehicle as claimed in claim 1 wherein the yaw pivot is rotatable through 180° thereby permitting the two vehicle units to be disposed in a parallel track configuration.

3. A vehicle as claimed in claim 2 wherein the two vehicle units are each provided with self-engaging latches for securing the two units together when disposed in parallel track configuration.

4. A vehicle as claimed in claim 1 wherein the articulation mechanism further includes at least one pitch pivot enabling relative rotation of the two units about a pitch axis.

5. A vehicle as claimed in claim 1 wherein the articulation mechanism further includes at least one roll pivot enabling relative rotation of the two vehicle units about a roll axis.

6. A vehicle as claimed in claim 1 wherein each vehicle unit has a forward end and a rearward end, and the track of each unit is provided with three direction changing rollers comprising two lower rollers defining a track base and an upper roller which is disposed forwardly of the track base in the rearward end to forward end direction, the centre of gravity of the vehicle unit being arranged to act substantially midway between the two lower rollers.

7. A vehicle as claimed in claim 6 wherein the two vehicle units are interconnected in back to back arrangement.

* * * * *